United States Patent
Tseo

[11] 4,064,961
[45] Dec. 27, 1977

[54] SLANTED CAVITY RESONATOR

[75] Inventor: Gudin Tseo, San Diego, Calif.

[73] Assignee: Rohr Industries, Incorporated, Chula Vista, Calif.

[21] Appl. No.: 673,398

[22] Filed: Apr. 5, 1976

[51] Int. Cl.² .................. G10K 11/04; F02K 1/26; B64D 33/06
[52] U.S. Cl. .................. 181/213; 181/222
[58] Field of Search ........... 181/33 HB, 33 H, 33 D, 181/42

[56] References Cited

U.S. PATENT DOCUMENTS

| | | | |
|---|---|---|---|
| 2,853,852 | 9/1958 | Bodine, Jr. | 181/33 HB |
| 2,990,906 | 7/1961 | Audette | 181/42 |
| 3,144,913 | 8/1964 | Bailey | 181/33 HB |
| 3,177,972 | 4/1965 | Wirt | 181/33 HB |
| 3,196,977 | 7/1965 | Sanders | 181/33 HB |
| 3,819,009 | 6/1974 | Motsinger | 181/33 H |
| 3,850,261 | 11/1974 | Hehmann et al. | 181/33 H |

Primary Examiner—Stephen J. Tomsky
Attorney, Agent, or Firm—Patrick J. Schlesinger; Frank D. Gilliam

[57] ABSTRACT

A combination fan jet engine nozzle plug and muffler. The combination comprises a nozzle plug structure formed from a plurality of inwardly slanted spaced apart elements. The elements form outwardly open and inwardly closed cavities. The cavities' openings are covered by porous skin material attached to the elements.

9 Claims, 6 Drawing Figures

SLANTED CAVITY RESONATOR

BACKGROUND OF THE INVENTION

The invention relates to sound attenuation of fan jet engines and specifically to an improved sound attenuating engine plug structure.

The major source of low frequency noise is produced by the turbulent combustion process. The combustion noise is characterized by a broad-band noise peaked at approximately 600 hertz. Prior art devices for reducing this core noise include lining the nozzle wall and/or the engine plug surface with acoustic material. This method was not completely successful as the resonant cavities that are formed in the state of the art duct lining material do not have the required depth for resonance at the low frequencies encountered due to available space. The duct lining material is too expensive to increase in thickness to achieve the required low frequency.

There has not been a successful solution to the core noise problem until the emergence of the instant invention.

SUMMARY AND OBJECT OF THE INVENTION

The invention effectively increases the useable sound attenuation area within the discharge nozzle of a fan jet engine without affecting engine performance or utilizing excessive space so that a sufficient number of increased volume resonators may be utilized in a given surface area. The normally unused hollow center of the plug assembly is employed to form a plurality of Helmholtz resonators of sufficient volume to suppress the desired low frequency sound.

It is a primary object of this invention to provide an improved engine plug of optimum size having sound absorption characteristics that substantially reduce the low frequency core noise of the engine.

The foregoing and various other features of the invention will appear in the course of the description which is rendered below with reference to the accompanying drawings wherein the same referenced numerals depict the identical element or part.

DETAILED DESCRIPTION OF THE PREFERRED EMBODIMENTS

Figure 1:
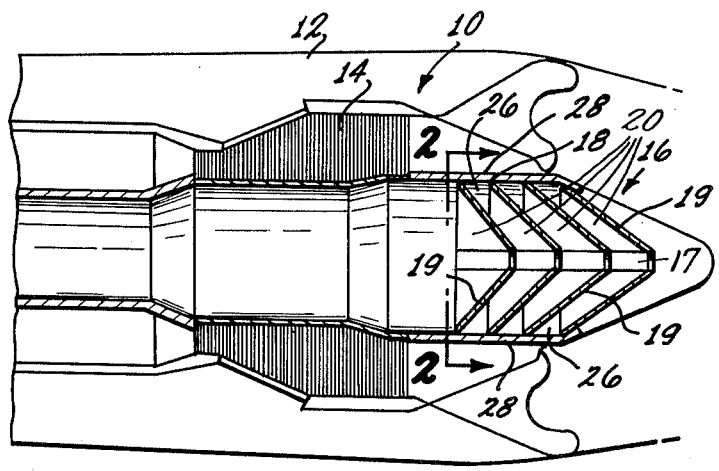
FIG. 1, is a partial cutaway view of a turbo-fan engine showing one embodiment of the nozzle plug slanted cavity resonator.

This invention relates to sound suppression utilizing the well known Helmholtz resonator principles. Such a resonator consists of a rigid cavity of selected volume, communicating with the external noise medium through a single opening having a radius A or a plurality of smaller openings having a combined area equal to radius A and a passage leading from the outer surface to the cavity. The lower the resonant frequency of the resonator the larger the cavity volume, the opening and the thickness of skin material. There are no restrictions as to the physical shape of the enclosure. For a given opening the volume of the cavity and not its physical shape is important. It is well known that as long as the linear dimensions of the cavity are considerably less than a quarter wave length and the total opening or openings to the cavity are not too large and the same skin thickness is constant, the resonant frequencies of the cavities having the same opening area to volume ratio but having very different shapes are found to be identical.

When designing the various cavities for specific resonance frequencies the following criteria are utilized: the static temperatures and pressure on the outer skin of the plug; the gas flow profile between the plug and the surrounding duct; the open area percentage of each cavity; the volume of the cavity; the acoustic resistance of the surface or skin material; and the conical angle.

Referring now to FIGS. 1-4, a fan jet engine 10 is housed in a nacelle 12 and includes a fan 14. A plug 16 is positioned at the center rear portion of the engine 10 and is co-axial therewith. Various means for attaching the plug 16 to the engine structure are well known and therefore will not be shown or explained. The rear most portion 18 of the plug 16 shown in cross-section, is formed from a plurality of nested cones 19 held in positional relationship by center rod 17. The center rod attachment to the nested cones may be by any convenient means, such as, but not limited to, welding, liquid interface diffusion and brazing. The center rod attachment seals the apex portion of each cone so that there is no communication between the cones. Attached to and overlapping the rear most cone is a blunt nose cone cover to provide a continuing airfoil surface at the rear of the plug 16. The cones may have equal slope angles and equal spacing therebetween when resonance at a specific frequency is required (see FIG. 3) or may be varied in slope angle and spacing when resonance at a range of different frequencies is desired (see FIG. 1).

Figure 2:
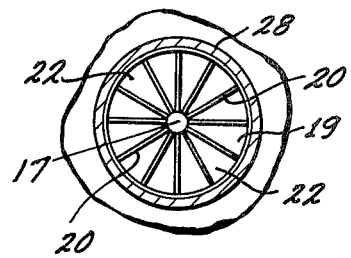
FIG. 2, is a view taken along lines 2—2 of FIG. 1.
Figure 4:
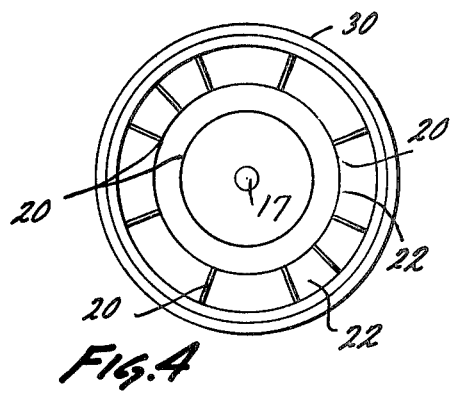
FIG. 4, is a sectional view of the FIG. 3 taken along lines 4—4 showing the positions of the radial cavity dividers.

Referring now to FIGS. 2 and 4, spacers 20 are placed radially between the adjacent nested cones to provide a plurality of enclosed cavity areas 22. In some applications, the conical slope angles of tthe various cones and the spacing between the cones are equal and the cone dividers 20 are positioned with equal radial spacing. This equally spaced divider placement provides uniform tuning of the cavities 22 as they all have substantially the same volume. The uniformly tuned embodiment, for example, may be resonant at a frequency of 500 hertz or any other single frequency within a desired range of from 200 hertz to 1000 hertz. When it is desirable to provide reasonance for a range of frequencies from, for example, between 200 hertz to 1000 hertz, the slope angles of the cones are varied as shown in FIG. 1. Additional variations of the resonance frequency can be provided by using skin material having a different percentage of openings positioned over various cavities.

Figure 5:
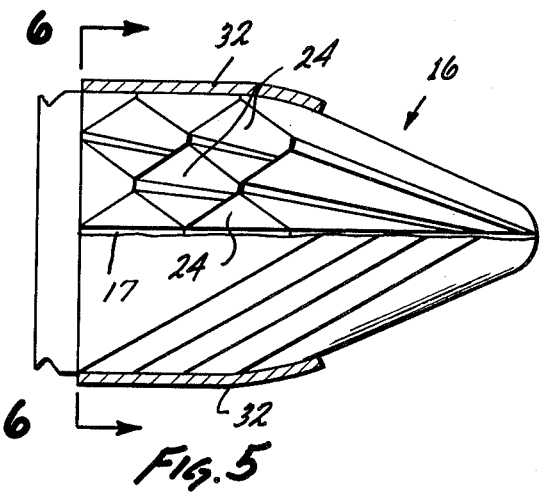
FIG. 5, is a perspective showing of a portion of the second embodiment of the nozzle plug slanted cavity resonator.
Figure 6:
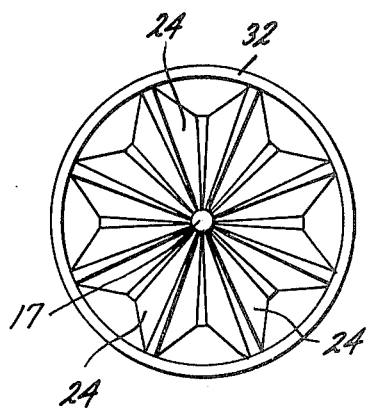
FIG. 6, an end view taken along lines 6—6 of FIG. 5.

Referring now to FIG. 5 and FIG. 6, the rear plug portion 18 may be constructed of a series of angled elongated cells 24 having a structure resembling honeycomb with the forward portion of the cells open and the rearmost portion closed by the joinder of the inward tapering sidewalls, thereby forming resonant cavities. It should be understood that these cells or cavities may be individually constructed in a known manner and secured together or constructed as one single unit of cells or cavities by honeycomb manufacturing methods so as to form the rear continuation of a conventional engine plug 16. As discussed above, the cells may have equal volume for like frequency resonance as shown by the last mentioned figs. or unequal volume for various different frequency resonances over a given range of frequencies as shown in FIGS. 3 and 4.

Referring now to FIG. 1, the outer openings 26 of the cavities 22 are enclosed with honeycomb or the like material 28 having perforations of a desired size therethrough for communicating with the cavity openings.

Figure 3:
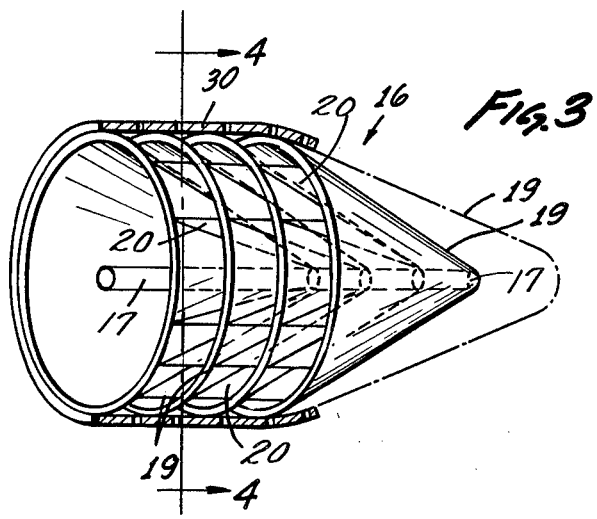
FIG. 3, is a perspective showing of a portion of a second embodiment of the nozzle plug slanted cavity resonator.

Referring now to FIG. 3, in another embodiment, the outer opening of the cavities are covered with a perforated thin skin material 30, such as, but not limited to, stainless steel or the like.

Referring again to FIG. 6, in still another embodiment, the outer openings of the cells 24 forming the cavities are shown covered with porous material 32 such as, but not limited to felt metal well known in the engine acoustic arts, or the like having a plurality of minute perforations therethough.

The type of material utilized to cover the outer openings of the cavities 22 and the cells 24 is selected for the application and resonant frequency range desired. The perforated material also provides a degree of rigidity to the structure, as well as, providing the required openings and necks to the cavity for practicing the Helmholtz resonator principles.

The materials 28, 30, 32 may be secured to the outer rim of the nested cones or the outer rim of the cell opening (see FIG. 5) by any conventional attachment means, such as welding, brazing or adhering by adhesive means so as not to seal off any of the material openings communicating from the air stream to the cavity openings. The openings through these materials to the various cavities are designed for a specific resonant frequency.

It will be understood that changes and modifications may be made to the structure described above without departing from the spirit and scope of the invention as set forth in the claims appended hereto.

Having thus described the invention, what is claimed as new and useful and desired to be secured by United States Letters Patent is:

1. A combination engine plug and muffler for a fan jet aircraft engine comprising:
a central plug structure formed of a plurality of inward slanting, spaced apart elements, said elements fixedly attached to a center member positioned co-axial with the center line of said engine and fixedly attached thereto, said spaced apart elements forming outwardly open and inwardly terminating cavities therebetween and pervious material attached to the outer periphery of said elements for covering the spaces between said spaced apart elements.

2. The invention as defined in claim 1, wherein said plurality of inwardly slanting elements are cones having equal slopes.

3. The invention as defined in claim 1, wherein said plurality of inwardly slanting elements are cones having unequal slopes.

4. The invention as defined in claim 1, wherein a plurality of dividers are positioned in a radial spaced apart relationship between, substantially perpendicular and having a sealed attachment to said center member and adjacent spaced apart elements for forming a plurality of radially positioned cavities.

5. The invention as defined in claim 1, wherein said plurality of inwardly slanting elements comprise honeycomb core structure with elongated cells having a rearwardly diminishing cross-section.

6. The invention as defined in claim 1, wherein said center member is a rod.

7. The invention as defined in claim 1, wherein said pervious material is metal skin.

8. The invention as defined in claim 1, wherein said pervious material is metal cloth.

9. The invention as defined in claim 1, wherein said pervious material is honeycomb structure.

* * * * *